US009412274B2

United States Patent
Lickfelt et al.

(10) Patent No.: US 9,412,274 B2
(45) Date of Patent: Aug. 9, 2016

(54) SYSTEM AND METHOD FOR PROVIDING A DISTANCE TO TARGET FOR REMOTE KEYLESS ENTRY

(71) Applicant: Honda Motor Co., Ltd., Tokyo (JP)

(72) Inventors: Brian K. Lickfelt, Powell, OH (US); John Sgueglia, Columbus, OH (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 14/474,827

(22) Filed: Sep. 2, 2014

(65) Prior Publication Data

US 2016/0063860 A1   Mar. 3, 2016

(51) Int. Cl.
*G08G 1/123* (2006.01)

(52) U.S. Cl.
CPC ...................................... *G08G 1/123* (2013.01)

(58) Field of Classification Search
None
See application file for complete search history.

(56) References Cited

U.S. PATENT DOCUMENTS

| 4,797,671 | A | 1/1989 | Toal, Jr. | |
|---|---|---|---|---|
| 6,529,142 | B2 | 3/2003 | Yeh et al. | |
| 6,838,987 | B1 | 1/2005 | Quinonez | |
| 7,474,208 | B1 * | 1/2009 | Klein | G08B 21/24 340/384.4 |
| 8,232,897 | B2 * | 7/2012 | Tieman | G01S 1/66 340/990 |
| 8,258,923 | B2 * | 9/2012 | Schulman | B60R 25/00 340/10.1 |
| 8,542,131 | B2 | 9/2013 | Jahn | |
| 8,547,253 | B2 * | 10/2013 | Proefke | G01S 13/74 340/5.72 |
| 8,922,397 | B2 * | 12/2014 | King | G01C 21/3635 340/990 |
| 9,080,878 | B2 * | 7/2015 | Skinder | G01C 21/16 |

FOREIGN PATENT DOCUMENTS

GB    2425021    10/2006

* cited by examiner

*Primary Examiner* — Adam Tissot
*Assistant Examiner* — Timothy Nesley
(74) *Attorney, Agent, or Firm* — Rankin, Hill & Clark LLP (57) ABSTRACT

A method and system for providing a distance to target vehicle finder function for remote keyless entry is provided. The method and system include enabling a vehicle finder function from a portable device and transmitting a low power signal from the portable device to a vehicle onboard receiver. The method and system further includes determining whether the vehicle onboard receiver receives the low power signal from the portable device and enabling a low power vehicle finding response. The method and system also include transmitting a high power signal from the portable device to the vehicle when it is determined that the vehicle onboard receiver does not receive the low power signal from the portable device, and enabling a high power vehicle finding response when it is determined that the vehicle onboard receiver receives the high power signal from the portable device.

20 Claims, 4 Drawing Sheets

SYSTEM AND METHOD FOR PROVIDING A DISTANCE TO TARGET FOR REMOTE KEYLESS ENTRY

BACKGROUND

Many vehicle remote keyless entry systems today include a vehicle finding function that allows a user to use a portable device such as a key fob to initialize a vehicle finding response to help them locate their vehicle. In most cases, when the user provides an input on the portable device to initiate the vehicle finding function, the vehicle provides only one type of vehicle finding response which generally consists of an elongated or repetitive actuation of the vehicle horn and/or the flashing of bright head lights and small lights. In addition, in most cases portable devices send a singular type of powerful radio frequency signal that utilizes a high amount of battery power and can rapidly drain the portable device battery.

A major limitation of this technology is that the standard type of vehicle finding response occurs irrespective of the type of vehicle, the environment in which the vehicle is located, and how near or far the user utilizing the portable device is located to the vehicle when he or she initializes the vehicle finding response. Vehicle manufacturers expend high amounts of resources to design more luxurious aspects into their vehicles to make them more aesthetically and environmentally pleasing to consumers. However, in many cases the standard vehicle finding response detracts from the luxurious design aspects of the vehicle as unnecessary noise and light disturbance is created irrespective of the fact that the user may be in close proximity of the vehicle.

This limitation also does not take into account the environment in which the vehicle is located. For example, when a user is locating a vehicle in close proximity that is located a residential neighborhood, the standard vehicle finding response can cause annoyance to the residents of the neighborhood and undue attention to the user locating the vehicle. Some vehicle manufactures have chosen to utilize a lower toned buzzer and smaller lights rather than the use of the horn and headlights to avoid some of these issues. However, this technique defeats the purpose of the vehicle finding function when the user is located further away from the vehicle outside a listening or viewing range.

SUMMARY

According to one aspect, a method for providing a distance to target vehicle finder function for remote keyless entry is provided. The method includes enabling a vehicle finder function from a portable device and transmitting a low power signal from the portable device to a vehicle onboard receiver. The method further includes determining whether the vehicle onboard receiver receives the low power signal from the portable device and enabling a low power vehicle finding response upon determination that vehicle onboard receiver receives the low power signal from the portable device. The method also includes transmitting a high power signal from the portable device to the vehicle upon determination that the vehicle onboard receiver does not receive the low power signal from the portable device, and enabling a high power vehicle finding response upon determination that the vehicle onboard receiver receives the high power signal from the portable device.

According to a further aspect, a system for providing a distance to target vehicle finder function for remote keyless entry is provided. Specifically, in accordance with this aspect, the system includes a portable device for enabling a vehicle finder function. The portable device includes a portable device transmitter transmitting a low power signal to a vehicle onboard receiver and a vehicle finding control module for determining whether the vehicle onboard receiver receives the low power signal from the portable device. The system further includes a vehicle finding control module determining whether the vehicle onboard receiver receives the low power signal from the portable device. The portable device transmitter transmits a high power signal to the vehicle onboard receiver when the vehicle finding module does not determine that the vehicle onboard receiver receives the low power signal from the portable device, and the vehicle finding response module enables a high power vehicle finding response when the vehicle finding control module determines the vehicle onboard receiver receives the high power signal from the portable device.

According to still another aspect, a method for providing a distance to target vehicle finder function for remote keyless entry is provided. The method includes enabling a vehicle finder function from a portable device. The method further includes transmitting a low power signal from the portable device to a vehicle onboard receiver based off of a user input of a lock input button on the portable device. The method also includes determining whether the vehicle onboard receiver receives the low power signal from the portable device and enabling a low power vehicle finding response when it is determined that vehicle onboard receiver receives the low power signal from the portable device. Additionally, the method includes transmitting an initial high power signal from the portable device on a different frequency than the low power signal to the vehicle when it is determined that the vehicle onboard receiver does not receive the low power signal from the portable device and transmitting a secondary high power signal from the portable device on a different frequency than the initial high power signal to the vehicle when it is determined that the vehicle onboard receiver does not receive the initial high power signal from the portable device. The method further includes enabling a high power vehicle finding response when it is determined that the vehicle onboard receiver receives the initial or secondary high power signal from the portable device.

DETAILED DESCRIPTION

The following includes definitions of selected terms employed herein. The definitions include various examples and/or forms of components that fall within the scope of a term and that can be used for implementation. The examples are not intended to be limiting.

A "processor," as used herein, processes signals and performs general computing and arithmetic functions. Signals processed by the processor can include digital signals, data signals, computer instructions, processor instructions, messages, a bit, a bit stream, or other means that can be received, transmitted and/or detected.

An "interface circuit" as used herein, refers to is a circuit that links one type of device or component such as the processor with another device or component and converts voltages between the processor and a receiving device or component.

A "bus" as used herein, refers to an interconnected architecture that is operably connected to transfer data between computer components within a singular or multiple systems. The bus can be a memory bus, a memory controller, a peripheral bus, an external bus, a crossbar switch, and/or a local bus, among others. The bus can also be a vehicle bus that interconnects components inside a vehicle using protocols such as Controller Area network (CAN), Local Interconnect Network (LIN), among others.

A "memory," as used herein can include volatile memory and/or nonvolatile memory. Non-volatile memory can include, for example, ROM (read only memory), PROM (programmable read only memory), EPROM (erasable PROM) and EEPROM (electrically erasable PROM). Volatile memory can include, for example, RAM (random access memory), synchronous RAM (SRAM), dynamic RAM (DRAM), synchronous DRAM (SDRAM), double data rate SDRAM (DDR SDRAM), and direct RAM bus RAM (DRRAM).

An "operable connection," as used herein can include a connection by which entities are "operably connected", is one in which signals, physical communications, and/or logical communications can be sent and/or received. An operable connection can include a physical interface, a data interface and/or an electrical interface.

A "computer communication," as used herein, refers to a communication between two or more computing devices (e.g., computer, personal digital assistant, cellular telephone, network device) and can be, for example, a network transfer, a file transfer, an applet transfer, an email, a hypertext transfer protocol (HTTP) transfer, and so on. Computer communication can occur using various protocols and technologies as is known in the art. For example, these can include a wireless system (e.g., IEEE 802.11, IEEE 802.15.1 (Bluetooth)), an Ethernet system (e.g., IEEE 802.3), a token ring system (e.g., IEEE 802.5), a near field communication system (NFC) (e.g., ISO 13157), a local area network (LAN), a wide area network (WAN), a point-to-point system, a circuit switching system, a packet switching system, a cellular network system (e.g., CDMA, GSM, LTE, 3G, 4G), a universal serial bus, among others.

A "vehicle", as used herein, refers to any moving vehicle that is capable of carrying one or more human occupants and is powered by any form of energy. The term "vehicle" includes, but is not limited to: cars, trucks, vans, minivans, SUVs, motorcycles, scooters, boats, personal watercraft, and aircraft. In some cases, a motor vehicle includes one or more engines.

An "input device" as used herein can include devices for controlling different vehicle features which include various vehicle components, systems, and subsystems. The term "input device" includes, but it not limited to: push buttons, rotary knobs, and the like. The term "input device" additionally includes graphical input controls that take place within a user interface which can be displayed by various types of mechanisms such as software and hardware based controls, interfaces, or plug and play devices.

An "output device" as used herein can include devices that can derive from vehicle components, systems, subsystems, and electronic devices. The term "output devices" includes, but is not limited to: display devices, and other devices for outputting information and functions.

Figure 1:
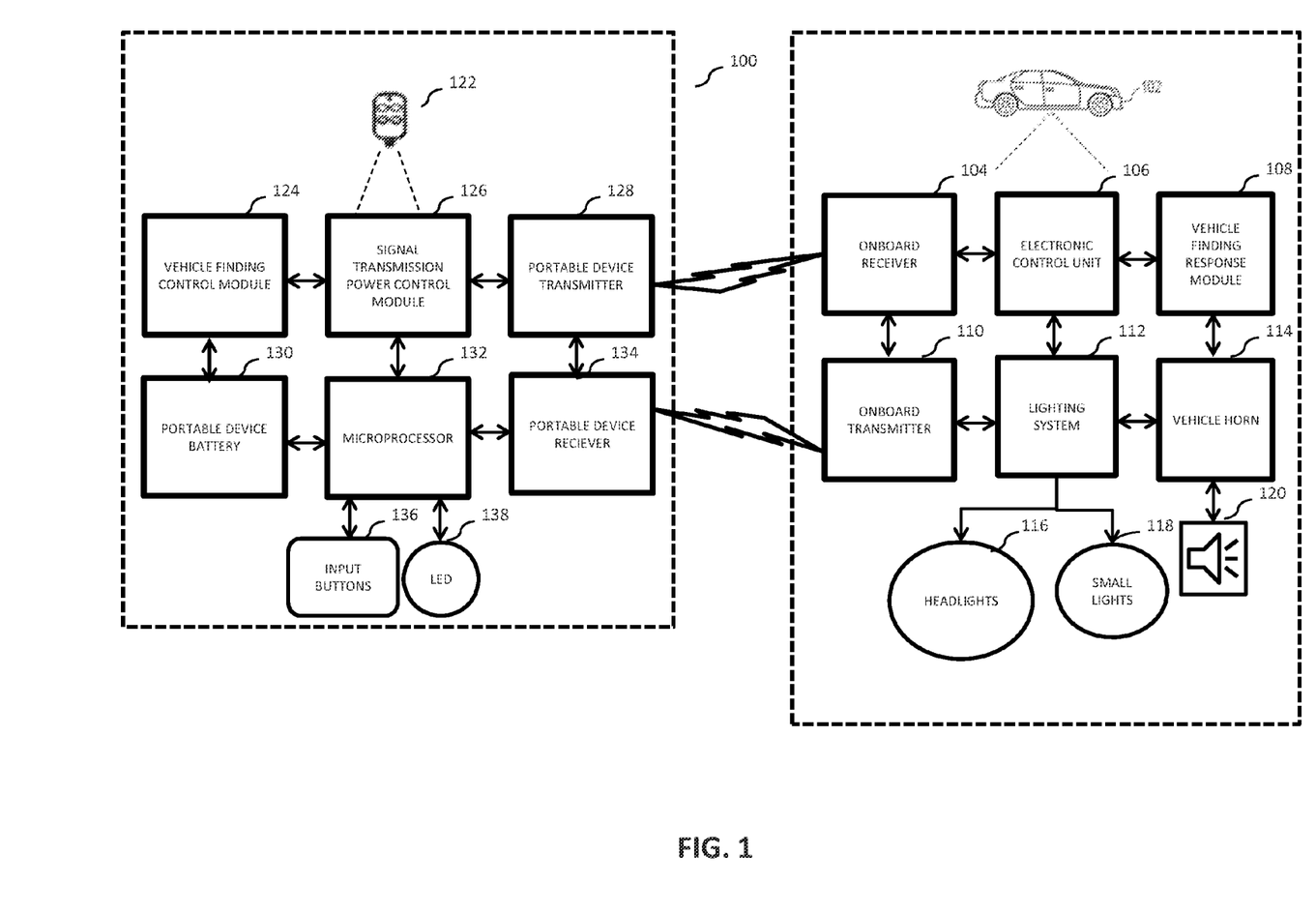
FIG. 1 is a schematic diagram showing a distance to target vehicle finder function system according to an exemplary embodiment of the present disclosure.

Referring now to the drawings, wherein the showings are for purposes of illustrating one or more exemplary embodiments and not for purposes of limiting the same. FIG. 1 shows an exemplary embodiment of a distance to target vehicle finder function system 100 which may be utilized to provide a vehicle finding function for a vehicle 102. The components of the distance to target vehicle finder function system 100, as well as the components of other systems, hardware architectures and software architectures discussed herein, can be combined, omitted or organized into different architecture for various embodiments.

The vehicle 102 of the distance to target vehicle finder function system 100 includes an onboard receiver 104, an electronic control unit (ECU) 106, a vehicle finding response module 108, an onboard transmitter 110, a lighting system 112, a vehicle horn 114, a plurality of headlights (headlights) 116, a plurality of small lights (small lights) 118, and one or more speakers 120. In an exemplary embodiment, the headlights 116 can include low beam and high beam headlights 116. Additionally, the small lights 118 can include parking lights, axillary lights (e.g., fog lights), and signal lights. It is to be appreciated that the vehicle 102 can also include a number of additional components and/or systems related to various vehicle functions. A vehicle keyless entry system may also be part of and/or may include the components of the distance to target vehicle finder function system 100.

The vehicle systems, components, and features are operably controlled by the ECU 106. The ECU 106 includes internal processing memory, an interface circuit, and bus lines for transferring data, sending commands, and communicating with the systems and components of the vehicle 102. Generally, the ECU 106 includes a processor and memory (not shown). The ECU 106 also includes a communications device (not shown) for sending data internally in the vehicle 102.

Several functions of the vehicle 102 can be additionally controlled by user input that is provided on one or more portable devices 122 that influence the ECU 106 based on wireless computer communication between the portable device 122 and the vehicle 102. The portable device 122 can be one or more of electronic key fobs, smart keys, mobile electronic devices, remote controls, and the like that can be part of the overall vehicle keyless entry system. The portable device 122 of the distance to target vehicle finder function system 100 includes a vehicle finding control module 124, a signal transmission power control modulator 126, a portable device transmitter 128, one or more portable device batteries 130, a microprocessor 132, a portable device receiver 134, a plurality of input buttons 136, and a LED light 138.

In the embodiment shown in FIG. 1, the distance to target vehicle finder function system 100 can be initialized when a user initializes a vehicle finder ON/OFF user interface input button that is included within a vehicle system user interface of the vehicle 102. For example, the vehicle 102 audio system user interface or navigation system user interface can include the vehicle finder ON/OFF user interface input button that can be utilized for the user to turn ON or turn OFF the distance to target vehicle finder function system 100 from the vehicle 102. In an alternate embodiment, the vehicle 102 can include a physical vehicle finder ON/OFF button or switch to initialize the distance to target vehicle finder function system 100. In another alternate embodiment, the portable device 122 can include a vehicle finder ON/OFF input button or switch that sends an ON or OFF is operably connected to the microprocessor 132.

Generally, the microprocessor 132 of the portable device 122 includes memory, an interface circuit, and bus lines, for transferring data, sending commands, communicating with the various components 124-138 and controlling an overall operation of the portable device 122. In some embodiments, the portable device 122 can include separate memory (not shown). The separate memory can store a specific identification code that specifically corresponds to the portable device 122 to be used as an identification mechanism by the vehicle 102. Additionally, the separate memory can store a vehicle identification number (VIN) of the vehicle that is paired to the portable device. In alternate embodiments, memory included within the microprocessor 132 can store the specific identification code and/or the VIN of the vehicle 102 that is paired to the portable device 122.

The vehicle 102 and/or the ECU 106 can also include internal storage memory (not shown) that can contain a list of one or more identification codes of paired/corresponding portable devices that can be utilized to identify matching identification codes and confirm the receipt of a signal from a paired portable device. In an exemplary embodiment, the portable device 122 remains constantly powered by the one or more portable device batteries 130 to allow the user the ability to manipulate a variety of vehicle systems, components, and functions by utilizing the plurality of input buttons 136 on the paired/corresponding portable device 122. The portable device LED light 138 can be utilized as an indicator to provide the user with status regarding the manipulation of the vehicle systems, components, and functions from the portable device 122. In an alternate embodiment, the portable device 122 can include a status screen that can provide information to the user regarding the status regarding manipulation of the vehicle systems, components, and functions from the portable device 122 along with the charge status of the portable device battery 130.

In an exemplary embodiment, upon receiving a user input on the plurality of input buttons 136 the microprocessor 132 sends commands via signals through the portable device transmitter 128 to be sent to the onboard receiver 104 of the vehicle 102. The microprocessor 132 can also be utilized to provide computer instructions based on signals sent to the portable device receiver 134 from the onboard transmitter 110 of the vehicle 102. In some embodiments, the portable device transmitter 128 and/or the onboard transmitter 110 can be a radio frequency (RF) transmitter that is utilized to transmit RF waves. Additionally, the portable device receiver 134 and/or the onboard receiver 104 can be a RF receiver that is utilized to receive RF waves. In some embodiments, the onboard receiver 104 and/or the portable device receiver 134 can include proximity sensors (not shown) that can be utilized to determine when the portable device is located within a certain proximity of the vehicle 102.

In alternate embodiments, the portable device 122 and/or the vehicle 102 can include one or more communications devices (not shown) in addition to or in lieu of the portable device transmitter 128, the onboard transmitter 110, the portable device receiver 134, and/or the onboard receiver 104. The one or more communication devices can utilize various protocols of wireless electronic communication (e.g., IEEE 802.11, IEEE 802.15.1 (Bluetooth)).

In an exemplary embodiment, the portable device 122 additionally includes a signal transmission power control module 126 that is operably controlled by the microprocessor 132 to controllably modulate the power associated with the signal that is provided by the portable device transmitter 128. In one embodiment, the signal transmission power control module 126 modulates the power associated with radio frequency signals that are transmitted from the portable device transmitter 128. In particular, the signal transmission power control module 126 can modify the amount of power that is provided by the portable device battery 130 to the portable device transmitter 128 to vary the power of the RF signal (e.g., within a range of 275-450 MHz) that is transmitted to the onboard receiver 104.

The signal transmission power control module 126 can be additionally controlled by the microprocessor 132 to provide fixed amounts of power based on predetermined settings (i.e., categorizations) of modulated signal transmission power that are provided by the vehicle finding control module 124. In one embodiment, the vehicle finding control module 124 can select between two signal transmission settings that include a 'low power signal setting', or a 'high power signal setting' to invoke the signal transmission power control module 126 to accordingly modulate the signal power of the signal transmitted by the portable device transmitter 128. In an alternate embodiment, the vehicle finding control module 124 can select between three signal transmission settings that are provided by the vehicle finding control module 124 and that include a 'medium power signal setting', in addition to the 'low power signal setting' and the 'high power signal setting' to invoke the signal transmission power control module 126 to accordingly modulate the power of the signal transmitted by the portable device transmitter 128.

The effect of transmitting a low power signal to the vehicle 102 is that the signal is not as far reaching as when the signal transmission power control module 126 modulates the RF signal to the medium RF signal power and/or the high RF signal power. Similarly, the effect of transmitting a medium power signal to the vehicle 102 is that the signal is not as far reaching as when the signal transmission power control module 126 modulates the RF signal to the high RF signal power. In an exemplary embodiment, the vehicle finding control module 124 invokes the signal transmission power control module 126 to modulate the power and/or signal power of the signal transmitted by the portable device transmitter 128 based on the distance between the portable device 122 (i.e., the user) and the vehicle 102, as discussed in detail below.

In one embodiment, when the vehicle finding control module 124 sets the signal transmission setting as the 'low power signal setting', the signal transmission power control module 126 responsively modulates the RF signal to a low RF signal power that is transmitted from the portable device transmitter 128 to the onboard receiver 104 (thereby using a lower amount portable device battery 130 power). Similarly, when the vehicle finding control module 124 sets the signal transmission setting as the 'high power signal setting', the signal transmission power control module 126 responsively modulates the RF signal to a high RF signal power that is transmitted from the portable device transmitter 128 to the onboard receiver 104 (thereby using a higher amount of portable device battery 130 power).

In an exemplary embodiment, when a command is received on the portable device 122 via the plurality of input buttons 136, the portable device transmitter 128 sends the RF signal that includes the identification code and corresponding command signal to the onboard receiver 104. The ECU 106 interprets the transmitted signal received by the onboard receiver 104 and actuates one or more vehicle systems, components, and/or features accordingly. In one embodiment, the vehicle finding module 124 determines that the portable device 122 is within a predetermined low range distance from the vehicle 102 or a high range distance from the vehicle 102 and accordingly invokes either the modulation of the signal to be a lower powered or high powered signal to be transmitted from the portable device 122 to the vehicle 102.

In an exemplary embodiment of the distance to target vehicle finder function system 100, the vehicle 102 includes a vehicle finder response feature that is operably controlled by the ECU 106 to provide a specific type of low power vehicle finding response or high power vehicle finding response based on the corresponding type (i.e., low or high) powered signal that is transmitted by the portable device transmitter 128 and received by the onboard receiver 104 (based on signal transmission setting set by the vehicle finding control module 124), as described in more detail below. In other words, the distance to target vehicle finder function system 100 provides the user with the ability to enable more than one type of vehicle finding response from the vehicle 102 based on the distance between the portable device 122 (i.e., the user) and the vehicle 102.

In one embodiment the portable device can include a plurality of input buttons 136 that include but are not limited to a vehicle lock input button, a vehicle unlock input button, a trunk open/close input button, an emergency alarm response actuation input button, and a vehicle finder actuation input button. In an alternate embodiment, the emergency alarm actuation input button can be utilized to actuate the vehicle finder response in place of the vehicle finder actuation input button. In some embodiments, the portable device may only include lock and unlock door/trunk input buttons that can be utilized to actuate the vehicle finder response and/or an emergency alarm response based on an input technique. For example, a triple input to the lock button can be utilized by the vehicle finding control module 124 to actuate the vehicle finder response.

In an exemplary embodiment, when the user inputs an input button utilized to actuate the vehicle finder response (e.g., the vehicle finder actuation input button) of the plurality of input buttons 136, the ECU 106 sends an actuation command to the lighting system 112 and/or vehicle horn 114 to alert the user of the location of the vehicle 102. In one embodiment, the vehicle horn 114 can be an independent component that includes its own speaker(s) 120 and operates irrespective of an audio system (not shown). In an alternate embodiment, the vehicle horn 114 is included as part of the audio system that is connected to the (external) speaker(s) 120. Upon actuation of the vehicle horn 114 by the ECU 106, the speaker(s) 120 are utilized by the vehicle horn 114 to emit the audio horn.

In one embodiment, upon user input of the input button utilized to actuate the vehicle finder response (e.g., the vehicle finder actuation input button) of the plurality of input buttons 136, the portable device transmitter 128 sends one or more RF signals which includes the identification signal along with a vehicle finding command signal to the onboard receiver 104. Upon receipt of the transmitted signal by the onboard receiver 104, the ECU 106 initially interprets the identification code and determines whether a matching identification code is included as part of stored identification codes that are stored within the memory, as described above. Upon finding a matching identification code within the list of paired portable device identification codes, the vehicle finding response module 108 utilizes the onboard transmitter 110 to transmit a confirmation signal to the portable device receiver 134. The confirmation code serves as to inform the portable device 122 that the vehicle 102 is in transmission receiving range with respect to the portable device 122.

The vehicle finding response module 108 can send a signal that includes a predetermined vehicle finding response setting to the ECU 106 to be utilized upon the determination that the matching identification code is transmitted by the portable device 122 (i.e., the matching identification code is present within the list of identification codes within the vehicle memory). The ECU 106 utilizes the lighting system 112 and/or the audio system to actuate the headlights 116, the small lights 118, and/or the vehicle horn 114 based on predetermined settings (i.e., categorizations) of vehicle finding responses provided by the vehicle 102. In one embodiment, the vehicle finding response module 108 can select between two vehicle finding response settings that include a 'low power vehicle finding response', or a 'high power vehicle finding response'. In an alternate embodiment, the vehicle finding response module 108 can select between three vehicle finding response settings that also include a 'medium power vehicle finding response', in addition to the 'low power vehicle finding response', and the 'high power vehicle finding response'.

In an exemplary embodiment, the vehicle finding response module 108 can analyze and determine the received signal strength (i.e., the signal power/magnitude of the electric field) of the transmitted RF signal transmitted by the portable device transmitter 128 and received by the onboard receiver 104 and determine the vehicle finding response setting that is to be utilized by the ECU 106. When the transmission power control module 126 modulates the RF signal frequency to transmit the signal strength based on signal transmission setting set by the vehicle finding control module 124 (e.g., low power signal, high power signal), as described above, the vehicle finding response module 108 can interpret the strength of the signal as a low power signal or a high power signal. The vehicle finding response module 108 can responsively invoke the corresponding low power or high power vehicle finding response setting to be sent to the ECU 106. For example, when the vehicle finding response module 108 determines that the portable device transmitter 128 has transmitted a low powered signal to the onboard receiver 104, the vehicle finding response module 108 can invoke the low power vehicle finding response to be employed by the ECU 106.

In an exemplary embodiment, the ECU 106 utilizes the lighting system 112 and/or the vehicle horn 114 to actuate various components such as the headlights 116, small lights 118, the vehicle horn 114, and the like to provide a low or high power vehicle finding response based on the vehicle finding response setting invocation by the vehicle finding response module 108. In other words, the ECU 106 can provide actuation of certain components based on the receipt of a low power signal by the onboard receiver 104 or a high power signal by the onboard receiver 104.

Specifically, when the portable device transmitter 128 is utilized to transmit a low power vehicle finding actuation signal, upon the onboard receiver 104 receiving the low power vehicle finding actuation signal, the vehicle finding response module 108 can invoke the low power vehicle finding response and the ECU 106 can utilize the lighting system 112 to intermittently actuate the small lights 118 to provide a lower illumination in comparison to the headlights 116. In addition, the ECU 106 can utilize the audio system to intermittently actuate a low toned (i.e., low volume) electronic buzzer, or an electronic beeper to provide a lower volume response (i.e., audio response with lower decibel level) in comparison to the vehicle horn 114. The lower power vehicle finding response will ensure that the user does not receive an unnecessarily loud and powerful response when the user is located in close proximity to the vehicle 102. In addition, transmission of a lower powered signal by the portable device transmitter 128 can ensure that the portable device battery 130 is not expending an unnecessary amount of charging power to actuate the vehicle finder response.

Alternatively, when the portable device transmitter 128 is utilized to transmit a high power vehicle finding actuation signal, the vehicle finding response module 108 can invoke a high power vehicle finding response and the ECU 106 can intermittently actuate the low and high beam headlights 116 to provide a higher illumination in comparison to the small lights 118. In addition, the ECU 106 can intermittently actuate the vehicle horn 114 to provide a higher volume response (high decibel rating) in comparison to the lower toned buzzer. The higher power vehicle finding response will ensure that the user that is located further away from the vehicle 102 is able to see or hear the vehicle finding response to properly locate the vehicle 102.

In an alternate embodiment, the ECU 106 can utilize the lighting system 112 and the audio system to intermittently actuate low beam headlights 116 and a higher toned buzzer to provide the middle power vehicle finding response, when the portable device transmitter 128 is utilized to transmit a medium power vehicle finding actuation signal. In some embodiments, the ECU 106 can utilize the vehicle horn 114 or the audio system to independently provide any type of vehicle finding response (low, medium, or high) by controlling the volume of the speaker(s) 120 that are used to emit sound of the vehicle horn 114. For example, the ECU 106 can enable the speaker(s) 120 to utilize a low volume profile to provide a low power vehicle response. Alternatively, the ECU 106 can enable the speaker(s) 120 to provide a high volume profile to provide a high powered vehicle response.

Figure 2:
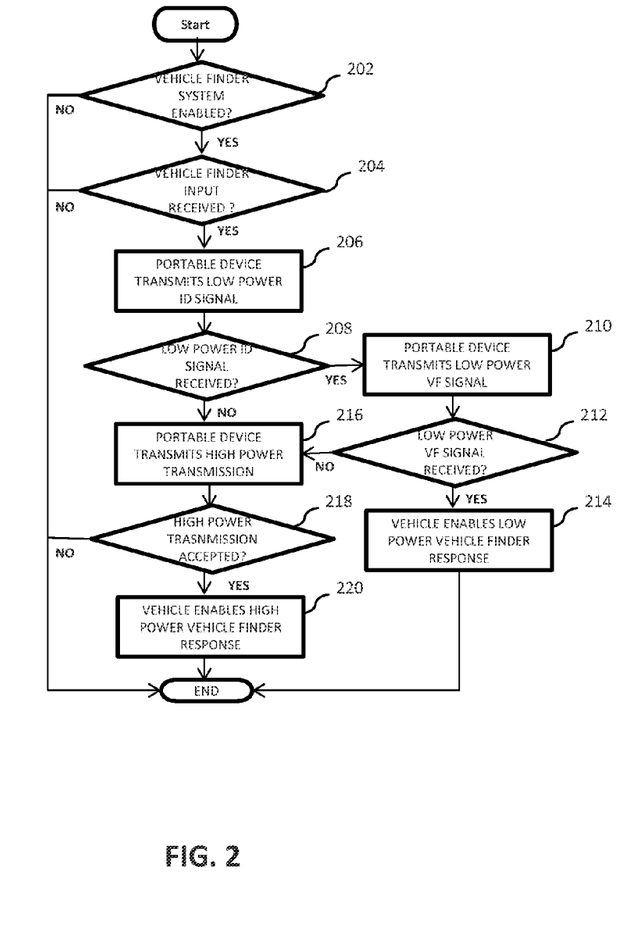
FIG. 2 is a process flow diagram of a method utilized the distance to target vehicle finder function system of FIG. 1.

Referring now to FIG. 2, a process flow diagram is shown of a method utilized by an exemplary embodiment of the distance to target vehicle finder function system 100 from the operating environment of FIG. 1. At step 202, the determination is made by the ECU 106 whether the vehicle finder system is enabled. In an exemplary embodiment, the ECU 106 determines whether an input has been received via the vehicle finder ON/OFF user interface input button on the vehicle system user interface (e.g., audio system user interface) to enable or disable the vehicle finder response system. At step 204, upon the determination by the ECU 106 that the vehicle finder system is turned ON (at step 202) the microprocessor 132 of the portable device 122 determines whether the input has been received on the plurality of input buttons 136 to enable the vehicle finder response via the portable device 122. For example, the user may input the input button utilized to actuate the vehicle finder response (e.g., the vehicle finder actuation input button) of the plurality of input buttons 136 to actuate the vehicle finder response in order to locate the vehicle 102 in a certain location.

At step 206, upon the determination by the microprocessor 132 that the vehicle finder input has been received to actuate the vehicle finder response from the vehicle 102 (at step 204), a low powered identification signal transmission that includes the identification code that is assigned to the portable device 122 is transmitted by the portable device transmitter 128 to the onboard transmitter 110 of the vehicle 102. In one embodiment, the vehicle finding control module 124 sets the signal transmission setting as the 'low power signal setting', and the signal transmission power control module 126 responsively modulates the RF identification signal to a low RF signal power that is transmitted from the portable device transmitter 128 to the onboard receiver 104.

At step 208, a determination is made whether the low power transmission of the identification signal is received by the onboard receiver 104 of the vehicle 102. In one embodiment, the determination that the low power (identification signal) transmission is received by the vehicle 102 is made by the vehicle finding control module 124 upon the portable device receiver 134 receiving a conformation signal from the onboard transmitter 110 of the vehicle 102. Specifically, when the onboard receiver 104 receives the low powered identification signal sent from the portable device transmitter 128, the vehicle finding response module 108 evaluates the identification code contained within the identification signal to determine whether the identification code matches with one of the identification codes included within the list of paired portable device identification codes that are stored within the memory of the vehicle 102 and/or the ECU 106. Upon finding a matching identification code within the list of paired portable device identification codes, the vehicle finding response module 108 utilizes the onboard transmitter 110 to transmit the confirmation signal to the portable device receiver 134.

If it is determined that the low power identification signal was received by the vehicle onboard receiver 104, (at step 208) the portable device 122 transmits a low power vehicle finder actuation signal to the vehicle 102 at step 210. When the confirmation signal transmitted by the onboard transmitter 110 is received by the portable device receiver 134, the vehicle finding control module 124 makes the determination (at step 208) that the low power transmission is received by the vehicle 102. In an exemplary embodiment, the vehicle finding control module 124 sets the signal transmission setting as the 'low power signal setting', and the signal transmission power control module 126 responsively modulates the RF vehicle finder actuation signal to a low RF signal power that is transmitted from the portable device transmitter 128 to the onboard receiver 104.

At step 212, the vehicle finding control module 124 determines whether the low power transmission of the vehicle finder actuation signal is received by the onboard transmitter 110. In one embodiment, once the vehicle onboard receiver 104 receives the low powered vehicle finder actuation signal, the vehicle finding response module 108 invokes the onboard receiver 104 to transmit a (second) confirmation signal to the portable device transmitter 128 to confirm the receipt of the vehicle finder actuation signal.

If it is determined that the low powered vehicle finding actuation signal was not received (at step 212) (i.e., the portable device receiver 134 did not receive the second confirmation signal sent from the onboard transmitter 110), the portable device 122 transmits a high power signal to the vehicle at step 216, as described in more detail below. For example, this scenario can occur when the user holding the portable device 122 is walking further away from the vehicle 102 between the time user enabled the vehicle finder (the onboard transmitter 110 sent the initial confirmation signal confirming receipt of the low powered identification signal) and the second confirmation signal.

Referring back to step 212, if it is determined that the low power vehicle finder actuation signal was received by the vehicle onboard transmitter 110, (i.e., the portable device receiver 134 did receive the second confirmation signal sent from the onboard transmitter 110) the vehicle finding response module 108 evaluates the power level of the vehicle finder actuation signal and determines that the onboard transmitter 110 received the low powered vehicle finder actuation signal. In one embodiment, the vehicle finding response module 108 responsively classifies the vehicle finding response accordingly as a low power vehicle finding response. At step 214, the vehicle finding response module 108 invokes the ECU 106 to utilize the lighting system 112, the audio system and/or the vehicle horn 114 to enable the low power vehicle finder response.

In an exemplary embodiment, the ECU 106 simultaneously utilizes the lighting system 112 to intermittently actuate the small lights 118, and the audio system to intermittently actuate the electronic buzzer and/or the electronic beeper. The lighting system 112 can employ various small lights 118 such as signal lights, auxiliary lights, identification lights, and/or parking lights to provide the low power vehicle finding response. Similarly, the audio system can employ various lengths of buzzer and beeper sounds that are provided from the electronic buzzer and/or the electronic beeper to provide the low power vehicle finding response. In an alternate embodiment, the lighting system 112 can employ various small lights 118 and the low beam headlights 116 to provide a low power vehicle finder response. Similarly the ECU 106 can utilize the speaker(s) 120 to emit the (low) volume controlled sound from the vehicle horn 114, the electronic buzzer, and/or the electronic beeper to provide the low power vehicle finding response.

Referring back to step 208, when the vehicle finding control module 124 determines that the low power identification signal was not received by the vehicle onboard receiver 104, a high powered signal is transmitted from the portable device transmitter 128 to the onboard receiver 104 at step 216. In one embodiment, the vehicle finding control module 124 sets the signal transmission setting as the 'high power signal setting', and the signal transmission power control module 126 responsively modulates the identification signal and the vehicle finder actuation signal into the single high powered signal that is transmitted from the portable device transmitter 128 to the onboard receiver 104.

At step 218, it is determined whether the high power transmission is accepted. In an exemplary embodiment, upon receipt of the high powered transmitted signal by the onboard receiver 104 (if the signal is received), the ECU 106 initially interprets the identification code and determines whether a matching identification code is included as part of stored identification codes that are stored within the memory, as described above. Upon finding a matching identification code within the list of paired portable device identification codes, the vehicle finding response module 108 evaluates the power level of the vehicle finder actuation signal and determines that the onboard receiver 104 received the high power vehicle finder actuation signal. In other words, if the matching identification code was not found by the ECU 106, the vehicle finder actuation signal would not be accepted and evaluated further. In one embodiment, once the matching identification code is found by the ECU 106, the vehicle finding response module 108 responsively classifies the vehicle finding response accordingly as a high power vehicle finding response. At step 220, the vehicle finding response module 108 invokes the ECU 106 to utilize the lighting system 112, the audio system and/or the vehicle horn 114 to enable the high power vehicle finder response.

In an exemplary embodiment, the ECU 106 simultaneously utilizes the lighting system 112 to intermittently actuate the headlights 116, the small lights 118, and the vehicle horn 114. The lighting system 112 can employ various small lights 118 such as the signal lights, the auxiliary lights, the identification lights, the parking lights, the low and high beam headlights 116 and the vehicle horn 114 to provide the high power vehicle finding response. In one embodiment, the audio system can employ high pitched buzzer and beeper sounds that are provided from the electronic buzzer and/or the electronic beeper to provide the high power vehicle finding response.

Figure 3:
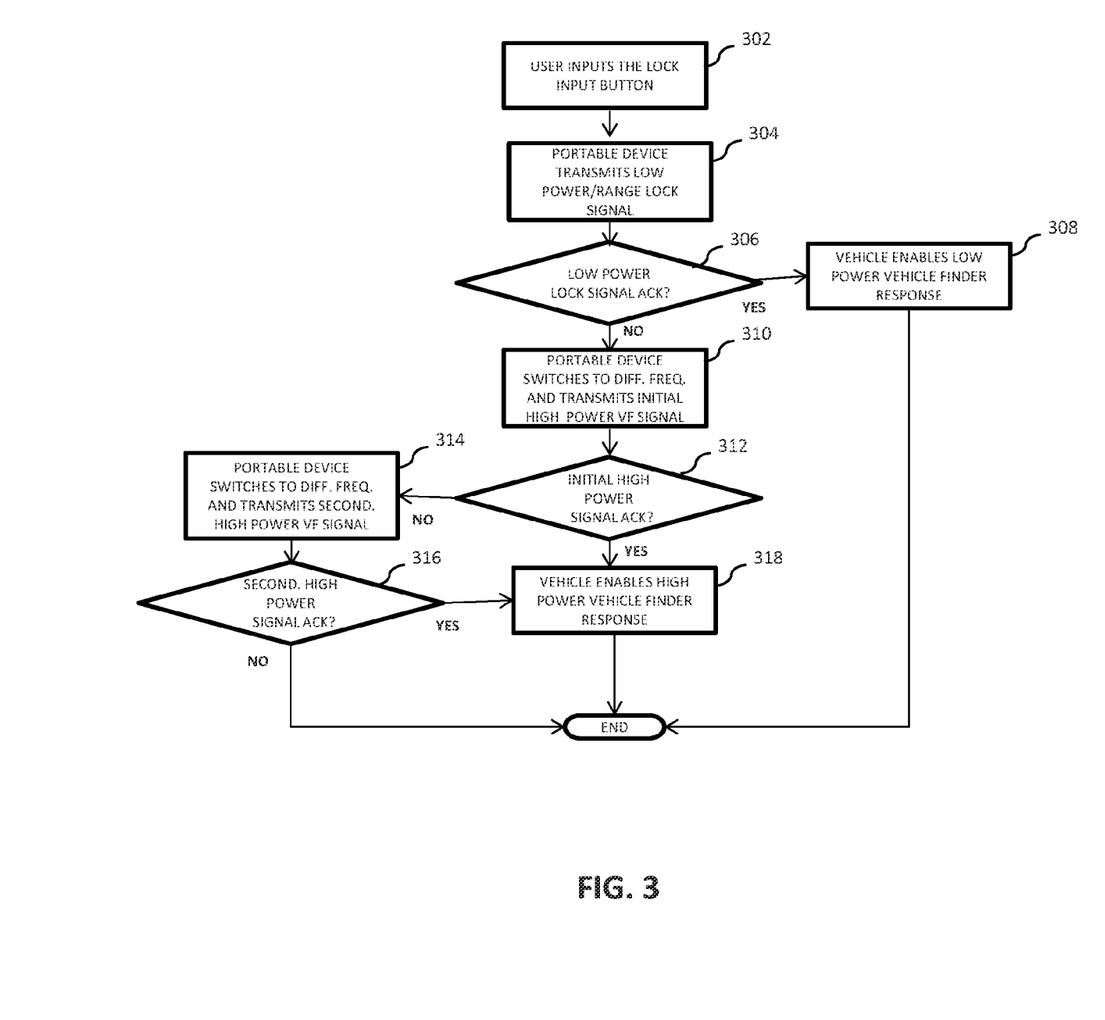
FIG. 3 is a process flow diagram of another method utilized by the distance to target vehicle finder function system of FIG. 1.

Referring now to FIG. 3, a process flow diagram is shown of an alternate method utilized by an exemplary embodiment of the distance to target vehicle finder function system 100 from the operating environment of FIG. 1. At step 302, the user inputs the lock input button of the plurality of input buttons 136 of the portable device 122. At step 304, the portable device 122 transmits a low power lock signal via the portable device transmitter 128 to the onboard receiver 104 of the vehicle 102.

At step 306, is it determined whether the lower power signal was acknowledged by the ECU 106. Specifically, if the onboard receiver 104 receives the low power lock signal sent from the portable device transmitter 128, a signal is sent to the ECU 106 and the ECU 106 responsively locks the doors of the vehicle 102. The ECU 106 also records (i.e., saves) an acknowledgement of the receipt of the low power lock signal within the memory and sends a low power acknowledgement signal to the vehicle finding response module 108 to be utilized by the distance to target vehicle finder function system 100.

At step 308, if it is determined that the ECU 106 sends the acknowledgment of the low power signal to the vehicle finding response module 108, (at step 306), upon receipt of the vehicle finder actuation signal by the onboard receiver 104, the vehicle finding response module 108 invokes the ECU 106 to utilize the lighting system 112, the audio system and/or the vehicle horn 114 to enable the low power vehicle finder response.

At step 310, if it is determined that the memory does not contain an acknowledgement of the receipt of the low power lock signal, (i.e., the low power lock signal was not received by the onboard receiver 104 and not sent to the ECU 106 to lock the doors) (at step 306), the portable device transmitter 128 switches its transmission frequency to a different frequency than the frequency utilized to send the low power signal (sent at step 304) and an initial high powered signal is transmitted from the portable device transmitter 128 to the onboard receiver 104.

At step 312, it is determined whether the initial high power lock signal is acknowledged by the ECU 106. Specifically, if the onboard receiver 104 receives the initial high power lock signal sent from the portable device transmitter 128, a signal is sent to the ECU 106 and the ECU 106 responsively locks the doors of the vehicle 102. The ECU 106 also records (i.e., saves) an acknowledgement of the receipt of the initial high power lock signal within the memory and sends a high power acknowledgement signal to the vehicle finding response module 108 to be utilized by the distance to target vehicle finder function system 100.

At step 318, if it is determined that the ECU 106 sends the acknowledgment of the high power signal to the vehicle finding response module 108, (at step 312), upon receipt of the vehicle finder actuation signal by the onboard receiver 104, the vehicle finding response module 108 invokes the ECU 106 to utilize the lighting system 112, the audio system and/or the vehicle horn 114 to enable the high power vehicle finder response.

At step 314, if it is determined that the memory does not contain an acknowledgement of the receipt of the initial high power lock signal, (i.e., the initial high power lock signal was not received by the onboard receiver 104 and not sent to the ECU 106 to lock the doors) (at step 312), the portable device transmitter 128 switches its transmission frequency to a different frequency than the frequency utilized to send the initial high power signal (sent at step 310) and a secondary high powered signal is transmitted from the portable device transmitter 128 to the onboard receiver 104.

At step 316, it is determined whether the secondary high power lock signal is acknowledged by the ECU 106. Specifically, if the onboard receiver 104 receives the secondary high power lock signal sent from the portable device transmitter 128, a signal is sent to the ECU 106 and the ECU 106 responsively locks the doors of the vehicle 102. The ECU 106 also records (i.e., saves) an acknowledgement of the receipt of the secondary high power lock signal within the memory and sends the high power acknowledgement signal to the vehicle finding response module 108 to be utilized by the distance to target vehicle finder function system 100.

At step 318, if it is determined that the ECU 106 sends the acknowledgment of the high power signal to the vehicle finding response module 108, (at step 316), upon receipt of the vehicle finder actuation signal by the onboard receiver 104, the vehicle finding response module 108 invokes the ECU 106 to utilize the lighting system 112, the audio system and/or the vehicle horn 114 to enable the high power vehicle finder response.

Figure 4:
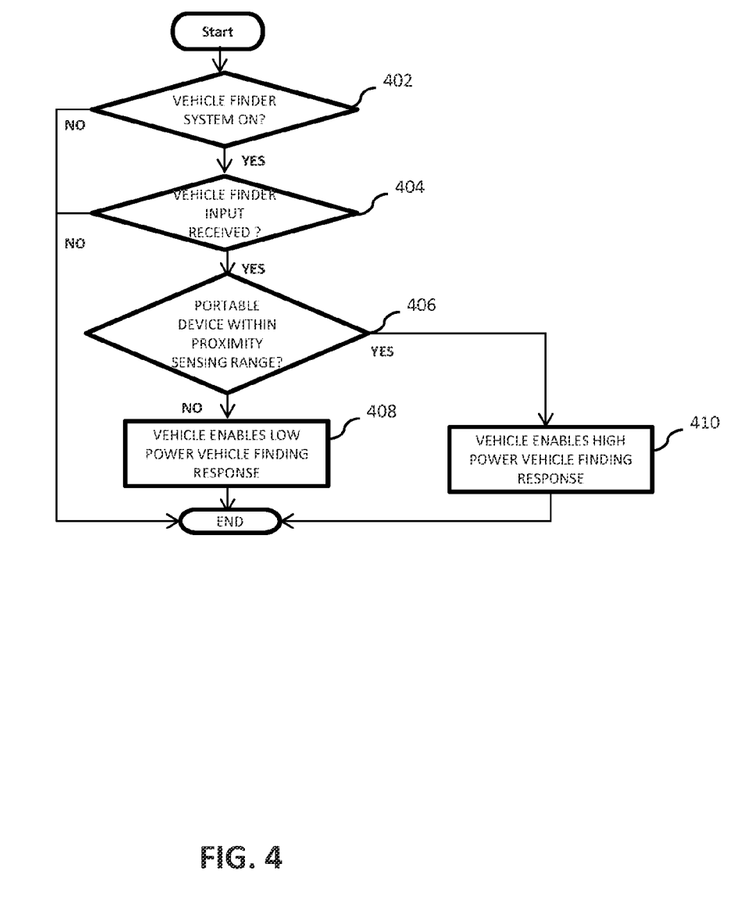
FIG. 4 is a process flow diagram of another method utilized by the distance to target vehicle finder function system of FIG. 1.

Referring now to FIG. 4, a process flow diagram is shown of an additional method utilized by an exemplary embodiment of the distance to target vehicle finder function system 100 from the operating environment of FIG. 1. At step 402, the determination is made by the ECU 106 whether the vehicle finder system is enabled. At step 404, the microprocessor 132 determines whether the input has been received on the plurality of input buttons 136 to enable the vehicle finder response via the portable device 122.

At step 406, it is determined whether the portable device 122 is within a proximity sensing range of the vehicle 102. In an exemplary embodiment, the proximity sensors of the onboard receiver 104 sense a proximity signal that is sent from a proximity device included as part of the portable device transmitter 128. Upon sensing the proximity signal, the onboard receiver 104 sends a proximity detection receipt signal to the ECU 106. The ECU 106 utilizes the proximity detection receipt signal to initiate various vehicle components. For example, the ECU 106 can unlock the doors of the vehicle 102.

If it is determined that the portable device 122 is within a proximity range (at step 406) (i.e., the proximity sensors sense the proximity signal being sent from the portable device 122), the ECU 106 sends a signal to the vehicle finding response module 108 to enable the low power vehicle finding response at step 408. If it is determined that the portable device 122 is not within a proximity range (at step 406), upon receipt of the vehicle finder actuation signal by the onboard receiver 104, the vehicle finding response module 108 enables the high power vehicle finding response at step 410.

In some embodiments, the target vehicle finder function system 100 can utilize a portable electronic device (i.e., smart phone, tablet, etc.) that include GPS sensors that interact with GPS (navigation) systems within the vehicle 102 to locate the portable electronic device (i.e., the user carrying the portable electronic device). The target vehicle finder system 100 can be initialized based on the distance that the portable electronic device is determined to be located from the vehicle 102 at the point in time that the input has been received on the plurality of input buttons 136 to enable the vehicle finder system via the portable device 122.

It will be understood by one of ordinary skill in the art that the systems and methods described herein may be adapted and modified as appropriate for the application being addressed or may be employed in other suitable applications, and that such adaptions and modifications are for purposes of illustrating one or more exemplary embodiments and not for purposes of limiting same. It will also be appreciated that various implementations of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A computer-implemented method for providing a distance to target for remote keyless entry comprising:
   enabling a vehicle finder function from a portable device;
   transmitting a low power signal from the portable device to a vehicle onboard receiver;
   determining by a vehicle finding control module provided in the vehicle whether the vehicle onboard receiver receives the low power signal from the portable device, wherein determining whether the vehicle onboard receiver receives the low power signal includes evaluating an identification code contained within the low power signal by a vehicle finding response module provided in the vehicle, wherein evaluating the identification code includes comparing the identification code with identification codes stored on a memory of an electronic control unit of the vehicle to identify matching codes, wherein upon determining that the vehicle receiver receives the low power signal, transmitting by a vehicle onboard transmitter a confirmation signal to the portable device, wherein upon receipt of the confirmation signal, the portable device transmits a low power vehicle finder actuation signal to the vehicle onboard receiver;
   enabling by the vehicle finding response module a low power vehicle finding response upon receipt of the low power vehicle finder actuation signal from the portable device, wherein enabling the low power vehicle finding response includes controlling a lighting system of the vehicle to provide a low illuminating light and controlling one or more of: an audio system to provide a low volume response, and a vehicle horn to provide a low volume response;
   transmitting a high power signal from the portable device to the vehicle onboard receiver upon determination that the vehicle onboard receiver does not receive the low power signal from the portable device; and
   enabling a high power vehicle finding response upon determination that the vehicle onboard receiver receives the high power signal from the portable device, wherein enabling the high power vehicle finding response includes controlling the lighting system of the vehicle to provide a high illuminating light and controlling one or more of: the audio system to provide a high volume response, and the vehicle horn to provide a high volume response.

2. The method of claim 1, wherein enabling the vehicle finder function includes determining whether a vehicle finding actuation input is received on the portable device.

3. The method of claim 1, wherein transmitting the low power signal includes at least one of transmitting an identification signal containing the identification code.

4. The method of claim 3, wherein determining whether the onboard receiver of the vehicle receives the low power signal includes the vehicle onboard receiver receiving the identification signal, and the vehicle onboard transmitter transmitting the confirmation signal to the portable device upon finding matching codes.

5. The method of claim 4, wherein enabling the low power vehicle finding response is dependent on the portable device receiving the confirmation signal from the vehicle onboard transmitter and the vehicle onboard receiver receiving the actuation signal containing the low vehicle finding actuation command from the portable device.

6. The method of claim 5, wherein enabling the low power vehicle finding response includes enabling intermittent actuation of one or more of: low beam headlights, parking lights, auxiliary lights, signal lights, identification lights, electronic buzzer, and electronic beeper.

7. The method of claim 5, wherein transmitting the high power signal includes transmitting an actuation signal containing a high power vehicle finding actuation command from the portable device to the vehicle onboard receiver when the portable device does not receive the confirmation signal from the vehicle onboard transmitter.

8. The method of claim 7, wherein enabling the high power vehicle finding response includes enabling intermittent actuation of one or more of: low beam headlights, high beam headlights, parking lights, auxiliary lights, signal lights, identification lights, electronic buzzer, electronic beeper, and the vehicle horn.

9. A system for providing a distance to target for remote keyless entry comprising:
   a microprocessor of a portable device that includes memory, an interface circuit, and bus lines, for transferring data, sending commands, communicating with various components of the portable device and controlling an overall operation of the portable device;
   an electronic control unit of a vehicle that includes memory, an interface circuit, and bus lines for transferring data, sending commands, and communicating with the systems and components of the vehicle;
   a portable device transmitter provided on the portable device configured to transmit a low power signal to a vehicle onboard receiver provided in the vehicle;
   a vehicle finding control module provided on the portable device configured to determine whether the vehicle onboard receiver receives the low power signal from the portable device, wherein the electronic control unit compares the identification code with identification codes that are stored within the memory to identify matching codes; and
   a vehicle finding response module provided in the vehicle configured to enable a low power vehicle finding response when the vehicle finding control module determines that the vehicle onboard receiver receives the low power signal from the portable device, wherein the vehicle finding response module enables the low power vehicle finding response by controlling a lighting system of the vehicle to provide a low illuminating light and controlling one or more of: an audio system to provide a low volume response, and a vehicle horn to provide a low volume response;
   wherein the portable device transmitter transmits a high power signal to the vehicle onboard receiver when the vehicle finding control module does not determine that the vehicle onboard receiver receives the low power signal from the portable device, and the vehicle finding response module is configured to enable a high power vehicle finding response when the vehicle finding control module determines the vehicle onboard receiver receives the high power signal from the portable device,
   wherein the vehicle finding response module enables the high power vehicle finding response by controlling the lighting system of the vehicle to provide a high illuminating light and controlling one or more of: the audio system to provide a high volume response, and the vehicle horn to provide a high volume response.

10. The system of claim 9, wherein the portable device enabling the vehicle finding function includes determining whether a user input has been received on a vehicle finding actuation input on the portable device.

11. The system of claim 9, wherein the portable device includes a signal transmission power control module varying the power of a signal that is transmitted from the portable device transmitter.

12. The system of claim 9, further including the vehicle onboard receiver receiving an identification signal sent from the portable device transmitter, and a vehicle onboard transmitter transmitting a confirmation signal to a portable device receiver.

13. The system of claim 12, wherein the vehicle finding response module enables the low power vehicle finding response dependent on the portable device receiver receiving the confirmation signal from the vehicle onboard transmitter and the vehicle onboard receiver receiving the actuation signal containing a low vehicle finding actuation command from the portable device transmitter.

14. The system of claim 13, wherein further including an electronic control unit of the vehicle enabling intermittent actuation of one or more of: low beam headlights, parking lights, auxiliary lights, signal lights, identification lights, an electronic buzzer, and an electronic beeper as a low power vehicle finding response.

15. The system of claim 13, wherein the portable device transmitter transmitting a high power signal includes transmitting the actuation signal containing a high power vehicle finding actuation command to the vehicle onboard receiver when the portable device receiver does not receive the confirmation signal transmitted from the vehicle onboard transmitter.

16. The system of claim 15, further including the electronic control unit enabling the intermittent actuation of one or more of: low beam headlights, high beam headlights, parking lights, auxiliary lights, signal lights, identification lights, the electronic buzzer, the electronic beeper, and a vehicle horn as a high power vehicle finding response.

17. A computer-implemented method for providing a distance to target for remote keyless entry comprising:
   enabling a vehicle finder function from a portable device;
   transmitting a low power lock signal from the portable device to a vehicle onboard receiver based off of a user input of a lock input button on the portable device;
   determining by a vehicle finding control module provided in the vehicle whether the vehicle onboard receiver receives the low power lock signal from the portable device, wherein determining whether the vehicle onboard receiver receives the low power lock signal includes evaluating an identification code contained within the low power signal by a vehicle finding response module provided in the vehicle, wherein evaluating the identification code includes comparing the identification code with identification codes stored on a memory of an electronic control unit of the vehicle to identify matching codes; wherein upon determining that the vehicle onboard receiver receives the low power lock signal, the electronic control unit records an acknowledgement of receipt of the low power lock signal on the memory of the electronic control unit and sends a low power acknowledgement signal to the vehicle finding response module;

enabling by the vehicle finding response module a low power vehicle finding response upon receiving the low power acknowledgement signal;

transmitting an initial high power lock signal from the portable device on a different frequency than the low power signal to the vehicle when it is determined that the vehicle onboard receiver does not receive the low power lock signal from the portable device;

transmitting a secondary high power lock signal from the portable device on a different frequency than the initial high power lock signal to the vehicle when it is determined that the vehicle onboard receiver does not receive the initial high power lock signal from the portable device; and enabling by the vehicle finding response module a high power vehicle finding response when it is determined that the vehicle onboard receiver receives the initial or secondary high power lock signal from the portable device.

18. The method of claim 17, wherein enabling the vehicle finder function includes determining whether a vehicle finding actuation input is received on the portable device.

19. The method of claim 17, wherein enabling the low power vehicle finding response includes enabling intermittent actuation of one or more of: low beam headlights, parking lights, auxiliary lights, signal lights, identification lights, electronic buzzer, and electronic beeper.

20. The method of claim 17, wherein enabling the high power vehicle finding response includes enabling intermittent actuation of one or more of: low beam headlights, high beam headlights, parking lights, auxiliary lights, signal lights, identification lights, electronic buzzer, and electronic beeper.

* * * * *